United States Patent [19]

Warner

[11] 3,749,823

[45] July 31, 1973

[54] SIGNAL PROCESSING CIRCUIT

[75] Inventor: Dwight Allen Warner, Westland, Mich.

[73] Assignee: Daedalus Enterprises, Inc., Ann Arbor, Mich.

[22] Filed: Nov. 26, 1971

[21] Appl. No.: 202,562

[52] U.S. Cl. .............................. 178/5.4 R, 178/6.8
[51] Int. Cl. ........................................... H04n 9/12
[58] Field of Search .......................... 178/5.4 R, 6.8

[56] References Cited

UNITED STATES PATENTS

| | | | |
|---|---|---|---|
| 3,193,838 | 7/1965 | Mitchell, Jr. | 178/5.4 R |
| 3,644,667 | 2/1972 | Shimotsuma et al. | 178/6.8 |

*Primary Examiner*—Richard Murray
*Attorney*—Arthur Raisch, Chester L. Davis, Jr. et al.

[57] ABSTRACT

Thermal ground data and thermal reference data acquired by an airborne scanner are recorded on magnetic tape along with timing signals synchronized with the scanning. At some later time, the signals are played back and processed to produce a color image on a line-scanned cathode ray tube and the image is recorded on a continuous color film strip. Ground data signals are processed by a particular analog-to-digital converter to provide digital signals according to the instantaneous level of the thermal ground data compared to discrete reference levels which in turn are calibrated according to the thermal reference data. The digital signals gate color guns in the cathode ray tube at fixed intensity levels so that the color image is composed of a predetermined number of colors.

12 Claims, 11 Drawing Figures

SIGNAL PROCESSING CIRCUIT

Infrared imagery techniques previously used only for military applications have more recently been applied to civilian commercial applications, for example, in infrared ground mapping for thermal pollution analysis, geological surveying, ice thickness reconnaissance, corn blight detection and forest fire detection. Techniques proposed for commercial application have recognized deficiencies and limitations with respect to both data acquisition and data reduction or data processing. In general, data acquisition is primarily qualitative only and has no quantitative meaning unless correlated with thermal references acquired continuously during infrared data acquisition. Quantitative temperature correlation could be obtained by actual temperature measurements at the site being mapped. However, this only provides sampled reference information of limited usefulness in a continuous ground map and moreover is of limited value because actual temperature samples cannot be taken on a real-time basis with respect to the infrared data acquisition; or, stated differently, the actual temperature and infrared data does not provide a synoptic view of the site.

Quantitative temperature correlation has also been attempted using radiometers flown in the aircraft along with the infrared scanning apparatus. Calibrated quantitative information from the radiometer can later be correlated to the infrared information obtained from the infrared scanner. However, this provides quantitative temperature information only along a narrow field of view along the flight path, sometimes referred to as a Nadir line, whereas the infrared scanner acquires data over a substantially wider field of view. Hence during acquisition, it is necessary to accurately correlate the radiometric data to the infrared data so that during data reduction the Nadir line can be matched to points on the corresponding infrared data. The quantitative information from the Nadir line must also be extrapolated to all other points in the infrared data that are off the Nadir line. This technique is time consuming and hence expensive and has limited accuracy as stated above due to a number of additional different factors.

Other significant limitations are encountered by virtue of the media used to record data. Perhaps the most widely used technique to record infrared data for ground mapping purposes is real-time recording directly on film by intensity modulation of a glow tube or a cathode ray tube to expose the film. Hence only the film recorded data is preserved. The original information signals used to generate the film are not retained. Substantial information can be lost during exposure of the film since this is primarily a matter of operator judgement to optimize the density and contrast of the exposure. Film recording is also subject to variation due to the ambient conditions, such as heat and moisture, which have a direct effect on the exposure as well as indirect effects, for example, camera speed variations when operating under extreme ambient conditions. Any information in the original signal that is lost during exposure cannot later be extracted during developing and processing of the film. During the developing process, variations in intensity and contrast due to developing times and temperatures, commonly known as gamma control problems, can cause additional information to be lost. Information lost during film developing cannot be recalled.

Although recording on film is perhaps the most popular technique used commercially in the United States, for certain limited applications thermal video signals have been recorded on magnetic tape for subsequent processing. Magnetic tape recording eliminates density and contrast control problems during film development and exposure and also provides a multiple replay capability that facilitates subsequent processing of the recorded signals into a ground map on film. However, the art has failed to develop meaningful data processing techniques to fully utilize the advantages obtained by direct recording of the thermal video signals on magnetic tape.

The objects of the present invention are to provide a signal processing circuit that facilitates meaningful infrared color presentations or infrared grey-tone presentations directly from recorded thermal signals; that facilitates direct correlation between analog signals and quantitative or qualitative temperature information; that facilitates variations for display enhancement under the control of the operator in a manner that preserves direct correlation between the display and qualitative and/or quantitative references levels; and/or that permits an operator to effectively evaluate signal subranges for increased sensitivity without losing correlation to other information within that subrange or within wider information ranges of interest.

A still further object of the present invention is to provide an analog-to-digital convertor that achieves accurate, effective and repeatable conversion while maintaining a direct correlation with either a qualitative or a quantitative reference; that provides accurate conversion of an analog signal over any one of a number of amplitude subranges within a wider amplitude range; and/or that provides sensitivity adjustments for conversion within a selected subrange while maintaining a direct correlation with conversion over other subranges or over the wider range.

Other objects, features and advantages will become apparent in connection with the following description, the appended claims and the accompanying drawings in which:

Figure 1:
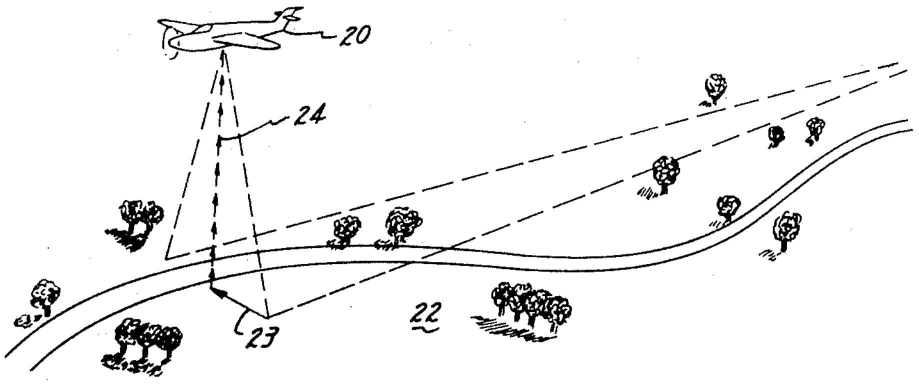
FIG. 1 is a view schematically illustrating the acquisition of infrared data by means of an airborne scanner.
Figure 2:
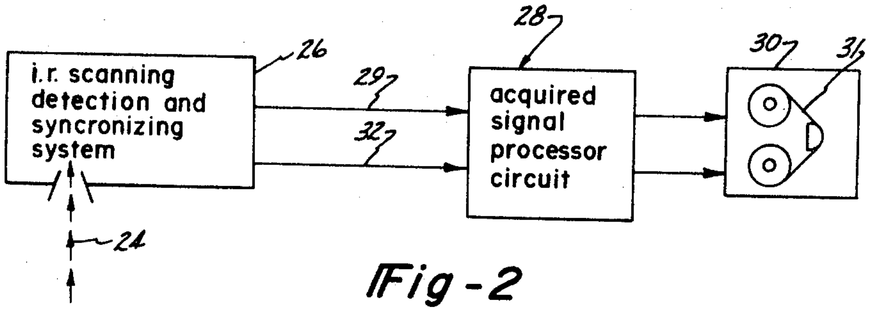
FIG. 2 is a block diagram of an infrared data acquisition system.

Referring in greater detail to the drawings, an airplane 20 is illustrated in a flight path over ground terrain 22 during airborne acquisition of infrared ground data 24 along transverse scan lines 23. Data 24 is received and detected by an infrared scanning, detection and synchronizing system 26 to provide a thermal ground signal 25 that is combined with internally generated thermal reference signals to form a composite thermal signal 27 (FIG. 10a) that is fed on line 29 to an acquired signal processing circuit 28. System 26 also generates synchronization signals which are fed via lines 32 to circuit 28. Circuit 28 processes the composite thermal signal 27, the synchronizing signals and gyrostabilization signals into a composite video signal (FIG. 10h) that is fed along with the synchronizing signal to a recorder 30 for recording on respective tracks on magnetic recording tape 31. Hence thermal ground data and thermal reference data are recorded on a real-time basis along with the necessary synchronizing information so that the thermal data can be later extracted.

Figure 3:
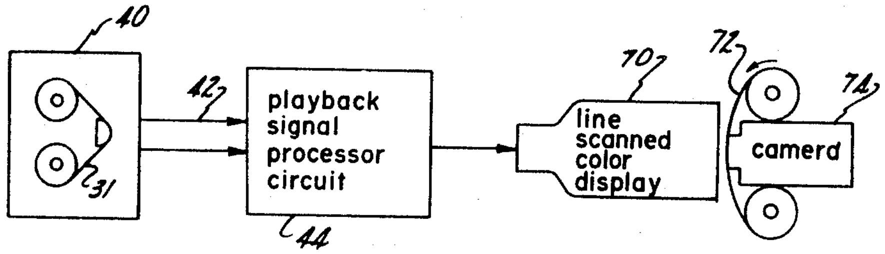
FIG. 3 is a block diagram of a data processing system.

The information recorded on tape 31 is subsequently processed by the circuit of FIG. 3. The original composite thermal video and synchronization signals are reproduced by a magnetic tape reproducer 40 and fed via lines 42 to a playback signal processor circuit 44. As will later be described in greater detail, the signal processor circuit 44 quantizes the thermal video signal within a predetermined range 50 (FIG. 4) according to six equal subranges or windows 56, 58, 60, 62, 64, 66. Range 50 is defined by a lower level limit 52 and an upper level limit 54 which are set by the thermal reference signals. Thermal video signals fall in window 56 when the signal is at or exceeds level 52 but is below a level 57. Similarly, the signal falls in window 58 when the signal is between levels 57 and 59, in window 60 when it is between level 59 and level 61, in window 62 between levels 61, 63, in window 64 between levels 63, 65, and in window 66 between levels 65, 54. Processor circuit 44 responds to the thermal video to develop appropriate digital signals representing the instantaneous level of the thermal video when it is below level 52, above level 54 or within any of the six windows 56, 58, 60, 62, 64, 66. The digital signals from circuit 44 are used to gate appropriate guns in a line-scanned color display 70 (FIG. 3). The line-scanned display at 70 is recorded on color film 72 by a color camera 74. Film 72 is moved transversely to the line scan on display 70 so that a continuous ground map in strip form is exposed on film 72.

Figures 4, 5:
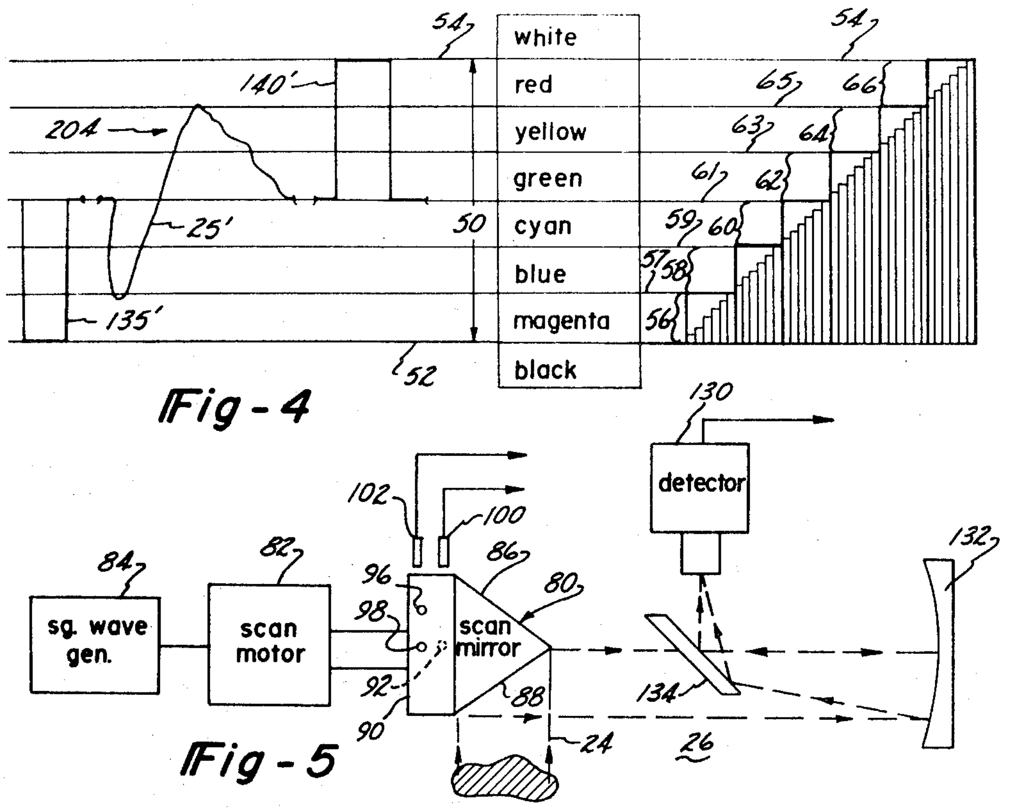
FIG. 4 is a diagram illustrating a quantizing operation performed by data processing circuitry.
FIG. 5 is a block diagram schematically illustrating scanning apparatus used in data acquisition.
Figure 6:
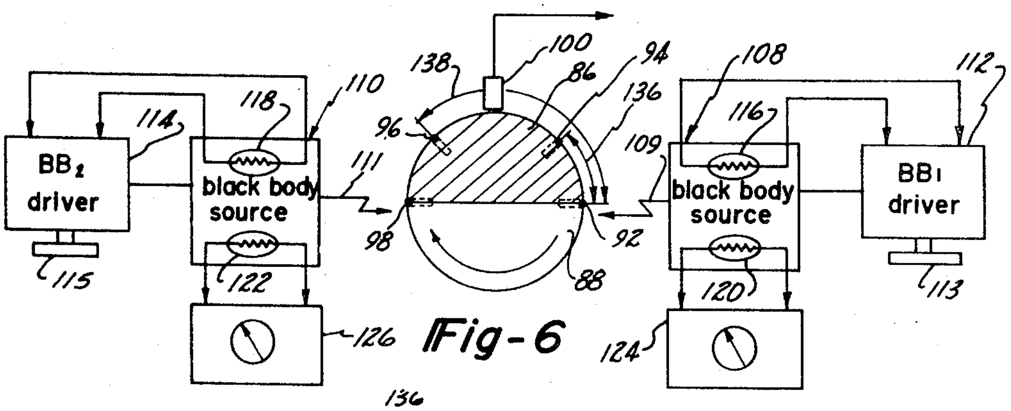
FIG. 6 is a view of the rotating mirror in the scanning apparatus of FIG. 5 and associated black body reference sources.

Referring in greater detail to the scanning portion of system 26 as illustrated in FIGS. 5 and 6, a conventional axe-blade scan mirror 80 is driven by a drive motor 82 energized from a square-wave generator 84 so that mirror 80 revolves at a constant and precise rpm. Only one mirror face 88 is active, with the other mirror face 86 being blackened out. Mirror 80 is rotated at a suitable speed depending on the desired application, including such factors as the airplane speed and altitude and the detector field of view. Typically, the speed of mirror 80 could be such as to obtain 60–120 scan lines per second. Mirror 80 also has an integral rear body portion 90 which carries a master timing pin 92 on one track and three control pins 94, 96, 98 spaced apart circumferentially on another track. Associated with each track is a respective magnetic pickup 100, 102 arranged so that during each revolution of mirror 80 pickup 100 responds to pin 92 to provide a master timing pulse train 104 (FIG. 10b) and pickup 102 responds to pins 94, 96, 98 to provide control pulse train 106 (FIG. 10c).

A pair of black body sources 108, 110 disposed at diametrically opposite sides of mirror 80 as shown in FIG. 6 are electrically energized from a respective driver circuit 112, 114. Each source 108, 110 comprises a plurality of thermoelectric modules mounted on one side of a respective common radiating plate and in thermal contact with suitable air-cooled heat sinks to stabilize the temperature of the thermal energy radiated at 109, 111 from the respective sources 108, 110 at the other side of the respective plates therein. Each driver 112, 114 has suitable feedback from a thermistor 116, 118, respectively, to maintain the temperature at each source constant at the desired respective temperatures selected by the operator on control knobs 113, 115. Each source 108, 110 also has a temperature monitoring thermistor 120, 122 and associated indicators 124, 126 that are calibrated directly in temperature units. In general, the temperatures at sources 108, 110 will be set in accordance with the active temperature range of interest in the acquired data 24. Preferably and for purposes of the examples hereinafter, the temperature at source 108 is set for a cooler temperature to provide the low level 52 (FIG. 4) and source 110 is set for a hotter temperature to provide the upper level 54. For example, when flying over water which contains thermal variations over a relatively narrow temperature range, the limits 52, 54 can be set relatively close together; whereas when flying over land which contains thermal variations over a wide range, limits 52, 54 would be set further apart.

Figure 7:
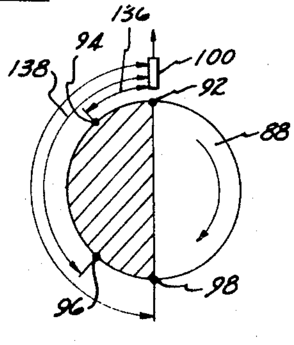
FIG. 7 is a view of the scanning mirror of FIG. 6 repositioned to the beginning of a scan line.
Figure 8:
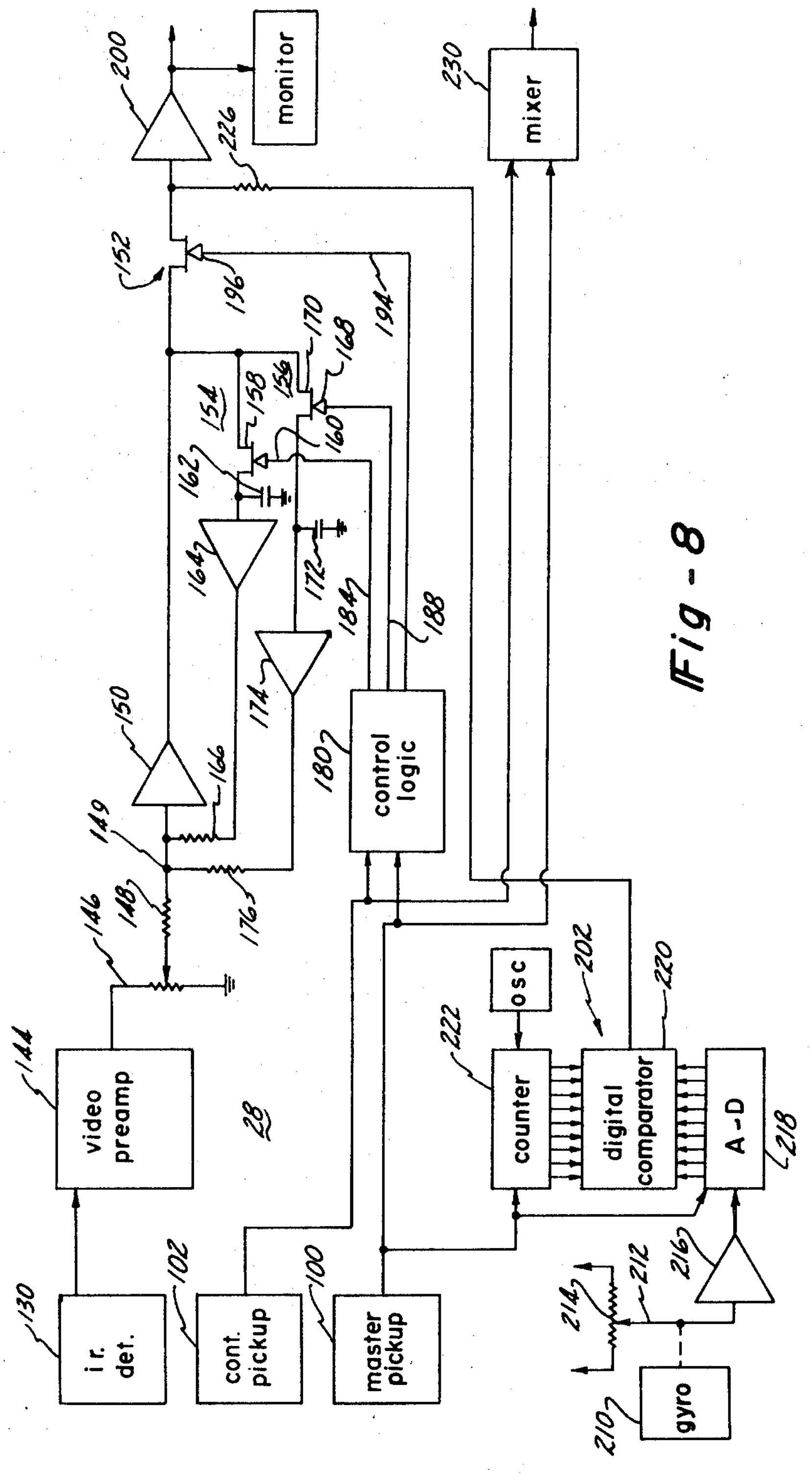
FIG. 8 is a block diagram of the video and timing circuits in the data acquisition system of FIG. 2.

During one revolution of mirror 80, and assuming that mirror 80 is initially positioned as shown in FIG. 7 with the master timing pin 92 aligned with pickup 100, the master timing pulse 104a is generated in time coincidence with viewing source 108 by the mirror face 88. The thermal energy 109 is optically focused on an infrared detector 130 (FIGS. 4 and 8) by means of a primary mirror 132 and a secondary mirror 134. As face 88 sweeps source 108, detector 130 generates a first thermal reference signal 135 (FIG. 10a) that is substantially level for approximately 8° of rotation. With continued rotation of mirror 80 in a clockwise direction as viewed in FIGS. 6 and 7, through an angle 136 of approximately 45° from the position in FIG. 7, the first control pin 94 will then align with pickup 102 to generate a first control pulse 106a. Beginning approximately 5° to 10° before pulse 106a, thermal data 24 is being acquired along the scan line 23 and focused on detector 130 to generate signal 25 (FIG. 10a). Data acquisition continues during rotation of mirror 80 through approximately the next 90° after pulse 106a; i.e., mirror 80 has rotated approximately through an angle 138 of approximately 135° from the starting position, at which point pin 96 sweeps pickup 102 to generate the second control pulse 106b. Data acquisition continues for 5° to 10° after pulse 106b; and as pin 98 approaches pickup 102, thermal energy 111 from source 110 is focused on detector 130 to generate the second reference temperature signal 140 while pin 98 generates a third control pulse 106c.

Referring in greater detail to the circuitry in the acquired signal processor circuit 28 (FIGS. 1 and 8), the composite thermal signal from detector 130 is fed through a video preamplifier 144, a potentiometer 146 and a summing resistor 148 to a summing point 149 at the input of an operational amplifier 150. In this regard, FIG. 10a illustrates the waveform of the composite thermal signal 27 as it appears at the output of preamplifier 144. The output of amplifier 150 is applied to an output gating switch 152 and to a pair of sample-and-hold circuits 154, 156 located in the feedback circuit for amplifier 150. The sample-and-hold circuit 154 comprises an analog switch 158 which is responsive to a strobe signal 182 (FIG. 10*d*) at its gate 160 to sample and transfer the instantaneous level of the signal from amplifier 150 to a capacitor 162. The DC level on capacitor 162 is continuously fed back to point 149 via an amplifier 164 and a summing resistor 166. Similarly, in response to a strobe signal 186 (FIG. 10*d*) at the gate 168 of an analog switch 170 in the sample-and-hold circuit 156, the signal from amplifier 150 is sampled instantaneously and stored on capacitor 172. Switches 152, 158 and 170 may be field-effect transistors. The DC level on capacitor 172 is continuously fed back to the summing point 149 via an amplifier 174 and a summing resistor 176. Strobe signals 182, 186 are derived from the master timing signal 104 and the control timing signal 106 by a control logic circuit 180 and are applied to respective gates 160, 168 via lines 184, 188. Strobe signals 182, 186 coincide respectively with the master timing pulse 104*a* and the third control pulse 106*a* and are of suitable width to effectively sample the peaks of the first and second reference signals 135, 140. Signal 186 can be generated by any suitable means, for example, a count-of-three counter which is reset by each master timing pulse 104*a*. The DC feedback via sample-and-hold circuits 154, 156 holds the DC level at the output of amplifier 150 at a point midway between the peak values of the reference signals 135, 140 to provide DC stabilization and thereby compensate for drift at detector 130. In this regard, it should be noted that the gain through circuit 28 can be varied at potentiometer 146. Gain variations at potentiometer 146 maintain a direct proportional correspondence between the thermal reference signals 135, 140 and the thermal data signal 25.

The control logic circuit 180 also internally generates an active video gate pulse 190 (FIG. 10*f*), the ends of which are coincident with the control timing pulses 106*a* and 106*b*. Control logic circuit 180 combines the strobe signals 182, 186 with pulse 190 to form a composite video gate signal 192 (FIG. 10*g*) which is applied via line 194 to the gate 196 of switch 152. The gated video from switch 152 is amplified at 200 along with a gyrostabilization pulse 224 from a circuit indicated generally at 202 to provide composite video signal 204 (FIG. 10*h*). The composite video signal 204 is fed from amplifier 200 to a suitable monitor 205 and to recorder 30 where it is recorded on one track of tape 31. In forming the composite video 204, the gating signal 190 shapes the thermal reference signals 135', 140' and provides the necessary separation from the gated thermal ground data signal 25'. By use of monitor 205, prior to useful data acquisition the operator can set the temperature at sources 108, 110 so that all of the useful thermal signal 25' is within limits 52, 54 determined by the amplitudes of reference signals 135', 140'.

The gyrostabilization pulse generating circuit 202 generally comprises a gyro 210 which mechanically actuates a wiper 212 of a potentiometer 214 to develop an analog voltage representing the roll of airplane 20. The analog roll signal at wiper 212 is fed through an amplifier 216 and entered into an analog-to-digital converter 218 in response to the master timing pulse 104*a* from pickup 100. Converter 218 converts the analog level to a binary number representing the amount of roll deviation of airplane 20. Preferably, when wiper 212 is positioned at the midpoint of potentiometer 214, corresponding to zero roll, the binary number generated by converter 218 will also be at its midrange, for example, at the number 512 which is the midrange of a 10-bit number. The binary number from converter 218 is entered into a digital comparator 220 for comparison against the count developed at a counter 222. Counter 222 is reset to zero, and counting is initiated in response to the master timing pulse 104*a*. When the count at counter 222 reaches the number at comparator 220 from converter 218, comparator 220 generates the gyrostabilization pulse 224 which is fed to amplifier 200 via a summing resistor 226. The position of pulse 224 in the composite video determines the roll correction necessary when the data is later processed. For example, each number step at converter 218 may represent 0.0216° which yields a very fine resolution over a total roll compensation of plus or minus 5°. The control timing signal 106 from pickup 102 and the master timing train 104 are also fed to a mixer 230 which forms a composite sync signal 231 (FIG. 10*j*) that is recorded on a separate track of tape 31 by recorder 30.

Figures 9, 10:
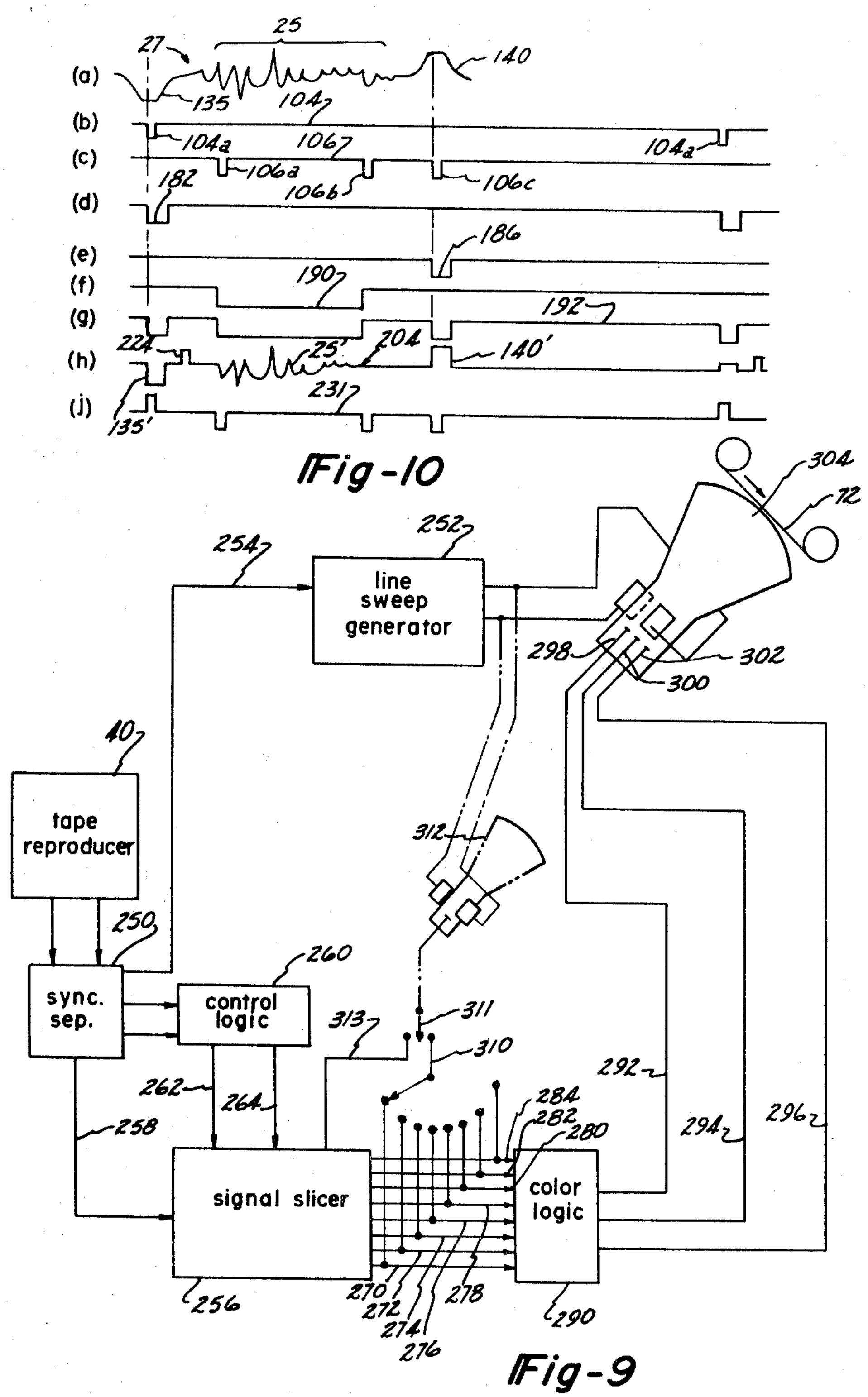
FIG. 9 is a block diagram of the video and timing circuits in the data processing system of FIG. 3.
FIG. 10 is a waveform and timing diagram useful in understanding the present invention.

Referring in greater detail to the playback signal processing circuit 44 (FIGS. 3 and 9), for purposes of simplifying the disclosure, the waveforms of signals derived from tape 31 during playback processing will be identified by reference to the corresponding signals prior to recording and illustrated in FIG. 10. The composite video signal 204 and the combined sync pulse train 231 derived from tape 31 by recorder 40 are fed to a sync separating circuit 250. The gyrostabilization pulse 224 is extracted from the composite video signal 204 by circuit 250 and fed to a line sweep generator 252 via line 254. The extracted composite video signal 204 is fed to a signal slicer 256 via line 258. The master timing signal 104 and the control timing signal 106 are extracted from the composite sync signal 231 and fed to a control logic circuit 260. The control logic circuit 260 in turn generates a pair of sampling signals 182', 186' (not shown) at respective lines 262, 264. These sampling signals 182'186' have waveforms corresponding to the strobe signals 182, 186 described hereinabove. As will later be described in greater detail, in response to the sampling signals 182', 186' and the composite video signal 204, the slicing circuit develops digital signals which represent the instantaneous level of the thermal video signal quantized according to the six windows 56, 58, 60, 62, 64, 66 (FIG. 4). Moreover, the output of slicer 256 is temperature calibrated in accordance with the two reference temperatures at sources 108, 110. Digital signals from slicer 256 are transferred via eight output lines 270, 272, 274, 276, 278, 280, 282, 284 to a color logic circuit 290 that generates color gate signals on lines 292, 294 and 296 for a blue gun 298, a red gun 300 and a green gun 302 in a line-scanned cathode ray tube 304. In accordance with the digital information on lines 270–284, one or more of the lines 292, 294, 296 will be activated to selectively energize guns 298, 300, 302 and thereby display predetermined colors as the beam on tube 504 is line scanned by generator 252. Guns 298, 300, 302 are not intensity modulated but rather gated on or off, either singularly or in combination, but always at a fixed intensity level, to provide the desired color on tube 304.

Color film 72 is continuously driven past tube 304 transverse to the scan lines thereon to expose a continuous complete strip map on film 72. The position of the gyrosynchronization pulse 224 applied to generator 252 advances or delays the initiation of each line scan on tube 304 so that the center of successive scan lines are accurately aligned and coincident with the center line of the flight path of the airplane 20. Scanning on tube 304 is on a single reoccurring horizontal line at one vertical position with no overlapping persistence between consecutive scan lines.

Digital signals available at lines 270–284 can be selected by means of a selector switch 310 and applied via a second switch 311 to an optional black-and-white cathode ray tube 312, shown in phantom lines in FIG. 9, for recording on black-and-white film. The signal on any one of lines 270–284 will generate a black-and-white isotherm in which only objects within a given temperature subrange will be displayed. The signal slicer 256 also generates a continuous quantized signal which can be selectively applied via line 313 and switch 311 to tube 312 to provide a sliced grey-level display.

Figure 11:
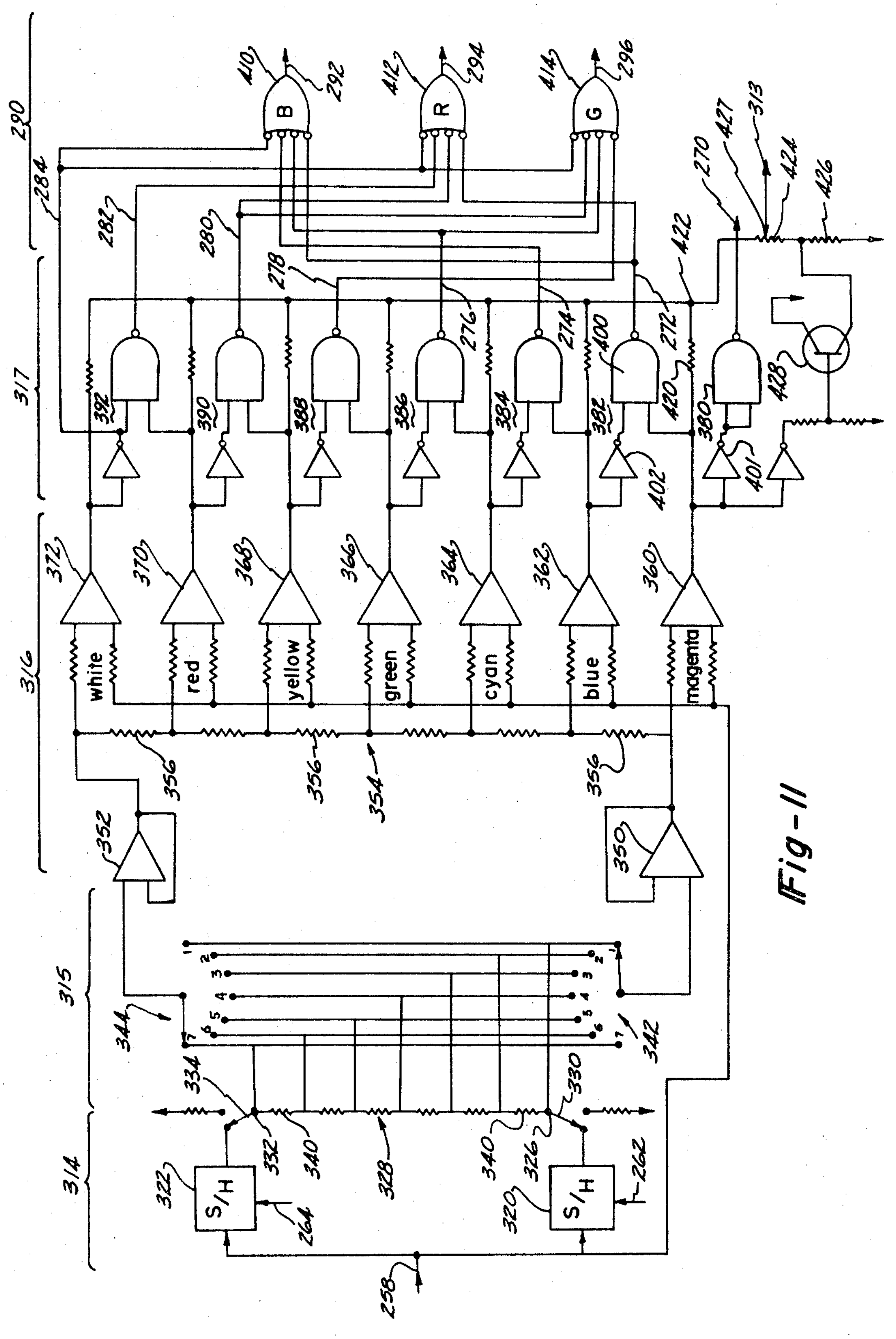
FIG. 11 is a more detailed diagram of signal slicer and color logic circuits in the circuit of FIG. 9.

Referring to FIG. 11, the signal slicer 256 generally comprises a reference circuit 314, a range selector circuit 315, a level detect circuit 316 and a logic circuit 317 that provide the digital signals for color logic circuit 290 (FIGS. 9 and 11). The composite video signal 204 is fed via line 258 from the sync separator 250 to a pair of sample-and-hold circuits 320, 322. Circuit 320 is gated by the sampling signal 182′ on line 262 to establish a DC voltage level through switch 330 at the lower terminal 326 of a voltage divider 328. Similarly, circuit 322 samples the composite video 204 on line 258 in response to the sampling signal 186′ on line 264 to establish a DC voltage level through switch 334 at the upper terminal 332 of divider 328. The reference voltage appearing across the divider 328 will be the difference between the thermal reference signals 135′, 140′, derived from the composite video 204. This in effect calibrates divider 328 and establishes the reference levels 52, 54 according to the two reference temperatures selected at sources 108, 110 during data acquisition. Switches 334, 330 can also connect the voltage divider 328 across a fixed reference voltage when non-quantitative processing is desired. Regardless of the recording level set by potentiometer 146 during recording, the output levels from reproducer 40 are preferably adjusted so that, for example, the voltage at terminal 332 is +2 volts and the voltage at terminal 326 is −2 volts. The resulting compression or expansion of the thermal video levels will not affect direct correlation to the temperature references and is desirable to assure proper reference levels in the level detector circuit 316.

Voltage divider 328 comprises six equal-value resistor portions 340 with appropriate taps taken to corresponding contacts in lower and upper selector switches 342, 344, respectively. To subdivide the full voltage range 50 into the six equal windows 56, 58, 60, 62, 64, 66 (FIG. 4), switch 342 is set on contact 1 and switch 344 is set on contact 7 as illustrated. For greater sensitivity within a temperature range, any one of the selected windows 56, 58, 60, 62, 64, 66, or combinations thereof, can be expanded and subdivided into six sub-windows by changing the contact settings at switches 342, 344. With switches 342, 344 set to contacts 1 and 7 as illustrated, the full voltage across divider 328 is fed through buffer amplifiers 350, 352 to a second voltage divider 354 in the level detection circuit 316. Divider 354 comprises six equal-valued resistors 356 with the voltage levels at the seven taps on divider 354 serving as respective reference level inputs for seven voltage comparators 360, 362, 364, 366, 368, 370, 372 to set the quantizing levels 52, 57, 59, 61, 63, 65 and 54 (FIG. 4). Comparators 360–372 each have a common signal input from line 258 so that the instantaneous level of the thermal video signal 25′ is continuously compared against all of the reference levels established at divider 354. Each of the comparators 360–372 has its output connected to a respective gating circuit 380, 382, 384, 386, 388, 390, 392 in logic circuit 317. Digital output signals from gating circuits 380–392 are transferred on respective lines 270–284 (FIGS. 9 and 11) to the color logic 290.

When the thermal video signal 25′ is below the reference level 52 set at the lowermost terminal on divider 354, comparator 360 is off and an output is developed at the line 270 by gating circuit 380. Gating circuit 380 comprises a NAND gate having both of its inputs connected to the output of an inverting amplifier 401. Comparator 360 also has its output connected to one input of a NAND gate 400, the other input of which is taken from comparator 362 through an inverting amplifier 402. When the amplitude of the thermal video 25′ is within window 56, i.e., above level 52 but less than level 57 derived across the lowermost resistor 356, gate 400 turns ON and gate 380 turns OFF to activate line 272 and deactivate line 270. In a similar fashion, as the amplitude of the thermal video 25′ increases, the next higher level comparator 362, and so on, will turn ON. For example, with a linearly increasing ramp function on line 258, the compartors 360 through 372 will be sequentially turned ON so that at the uppermost window 66, but below the upper reference level 54, comparators 360, 362, 364, 366, 368, 370 will all be ON, but only line 282 will be activated. Similarly, when the thermal video 25′ exceeds the upper level 54, all of the compartors 360 through 372 will be ON but only line 284 will be activated. Hence depending on the instantaneous value of the thermal video 25′ , one or more of the comparators 360–372 may be ON, but only one of the lines 270–284 will be activated.

The lines 272–284 are interconnected to three color gun NOR gates 410, 412, 414, blue, red and green, respectively, in the manner illustrated so as to activate the appropriate gate or gates according to the color scale illustrated in FIG. 4. For example, when the thermal video signal 25′ is below the reference level 52 and none of the lines 272–284 are activated, all three gates 410, 412, 414 will be off and hence the screen of cathode ray tube 304 will be black. When gating circuit 382 activates line 272, the blue gate 410 and the red gate 412 are activated to gate on the blue and red guns 298, 300 so that the color generated on the line scan is magenta. The manner in which remaining colors, i.e., blue, cyan, green, yellow, red and white, are generated will be readily apparent from the circuit of FIG. 11 and the color designations for comparators 360–372 when referenced to the color scale of FIG. 4.

The output of each of the comparators 360–372 is also fed through an associated summing resistor network consisting of seven respective resistors 420 tied to a common terminal 422 which in turn is connected to a potentiometer 424 and a fixed resistor 426. A digital signal available on line 313 from wiper 427 is a quantized version of the thermal signal 25' for black-and-white display. Hence for purposes of illustration, if a linearly increasing ramp is applied to line 258, the output developed at wiper 427 will be a linear step function whose waveform corresponds to that illustrated in FIG. 4. Resistor 426 is arranged to be shorted out by a transistor 428 when the thermal video signal 25' is below level 52 and comparator 360 is off. This suppresses noise and signals below level 52 and assures that the optional black-and-white tube 312 is completely blank.

For purposes of illustrating a typical application of the infrared imagery system described hereinabove, it is assumed that a ground map is to be obtained over water. For this application, reference sources 108, 110 could typically be set so that range 50 (FIG. 4) represents a temperature difference of 18°F. Reference source 108, and hence level 52, could be set at 50°F and source 110 and level 54 at 68°F. This means that each of the windows 56, 58, 60, 62, 64, 66 and the corresponding respective colors represents a temperature range of 3°F. Hence each of the six main colors along with the black level and white level will have a definite correlation to the temperatures set at sources 108, 110. If it is desired to look at a particular temperature subrange in greater detail, the selector switches 342, 344 can be set accordingly. For the example set forth hereinabove, if it is desired to look at temperatures within the range of 50°F to 53°F, the selector switch 342 remains at contact 1 and selector switch 344 is moved to contact 2. At these settings, the total voltage applied across divider 354 will be one-sixth the voltage applied thereto for the full range of 18°F. Each comparator will then be activated according to temperature differences of one-half of a degree in the range of from 50°F to 53°F. Similarly, if it is desired to further evaluate a temperature range of 56°F to 62°F, switch 342 is set to contact 3 and switch 344 is set to contact 5. Comparators 360–372 will provide a sensitivity of 1°F in the color sequence over the temperature range of 56°F to 62°F. In all such cases, there is a direct temperature correlation for the colors generated on display 70.

Although slicing circuit 256 has been described hereinabove with automatic referencing to a quantitative thermal reference via sources 108, 110, it will be apparent that substantial advantages can be obtained by processing data that was acquired without real-time recording of the thermal references from sources 108, 110. This data is processed with switches 330, 334 connected to the fixed reference source so that different colors in the display will represent percentage temperature variations within the overall scene. If desired, the data could be interpreted in greater detail by thermal references obtained by some technique other than thermal reference sources 108, 110. The qualitative results can also be subjected to further evaluation within any subrange by means of the selector switches 342, 344. Although color is preferred for many applications, the signal available at wiper 427 will intensity modulate the optional black-and-white CRT 312 to provide a more meaningful black-and-white display as contrasted to a continuous grey-tone display. For a number of applications, this will enhance temperature differences and sharpen the resolution of the objects against their background. Additionally, it is usually simpler to compare relative temperatures of objects against the ground scene and to locate objects having substantially the same temperatures.

The basic sequence of six colors, either alone or together with the black and the white indications of under range and over range, provides color imagery that is definitive and facilitates data interpretation, particularly when combined with quantitative temperature references. The color range has been sequenced to provide a logical transition from hottest to coldest thermal information. Although more or less colors might be used, a six-level or six-basic-color spectrum provides good visual perception between different colors and is compatible with a three-gun color display using simple gating circuits. The use of slicer 256 for optional grey-level slicing also determines the choice of six basic colors in that visual perception between more than approximately eight gray levels becomes quite difficult. Although the present invention contemplates using more than six basic colors, adding additional colors will ultimately require the use of hue and intensity variations of the basic colors. Subtle hue and intensity variations will not be visually perceptible and will impair the accuracy of a display and complicate interpretation. Hence there is an upper limit on the number of colors that can be used.

With the present invention, the number of colors is predetermined by the voltage divider 354, logic circuits 317 and color gates 290, rather than displaying continuous color, hue and intensity variations that would be obtained by full-range intensity modulation at guns 298, 300, 302 with an analog signal. Approximately 12 to 18 predetermined colors is a useful upper limit for most color film applications, although substantially more levels might be useful for computer analysis of processed data. With the present invention, the color guns 298, 300, 302 in CRT 304 are merely gated on and off at preset fixed intensity levels. Hence the color generated on the cathode ray tube 304 is always one of the predetermined colors indicated, namely, red, yellow, green, cyan, blue or magenta, alone or alternatively with black and white, depending on the instantaneous level of the thermal video. This assures an accurately reproducible image on the color tube 304 with accurate quantitative color referencing when the levels 52, 54 are set in accordance with recorded reference levels originally acquired from sources 108, 110. By using the linearly subdivided voltage divider 328 in the input to the divider 354, the original data signal can be accurately subdivided in different ways without losing thermal reference to any other of the subranges. Accuracy of thermal readings is not dependent on color hue or slight color impurities on tube 304 but rather on the preestablished voltage relationship at comparators 360–372 prior to color coding by digital signals at the gates 410, 412, 414. Preferably a color wedge is generated on tube 304 according to the preset levels at detectors 360–372 so that any color and hue variations introduced during exposure or development of the film will not impair temperature correlation between colors.

Although the aforementioned color sequence is preferred, it will be understood that other color sequences could be selected and appropriate displays generated by merely changing the connections of lines 272–284 to gates 410, 412, 414. However, the described color sequence is preferred and, based on experience, provides an aesthetically pleasing and meaningful color presentation of thermal data by designating the hottest quantitatively referenced color information as red and then allocating cooler temperatures sequentially through the color spectrum.

According to an important aspect of the present invention, the color film 72 results directly from the original recorded signals that were obtained directly from the detector 130. Hence the color display is not subject to variances that might otherwise be present where thermal signals are recorded on film during acquisition. Accurate repeatability is assured because the thermal ground data and thermal reference data are acquired, processed and recorded via the same channels and in real-time coincidence. Accurate repeatable versions can be obtained at any time over an indefinitely long period. Color film exposure with a line-scanned display, as contrasted to a raster scan, generates a continuous film strip along the complete flight line of interest without breaking continuity. The line-scanned display eliminates all problems of registry of the color lines that might otherwise occur with raster-scan systems. The rectilinear sweep of a line-scanned display can be easily compensated to eliminate distortion that might otherwise be present due to variations in scanning speeds at the ends of the scan lines. Although a single-channel, single-spectrum system has been described, the invention is also applicable to multi-spectral systems by suitable optical separation techniques using dichroic mirrors. Infrared energy in different spectrums can be separated and focused on corresponding detectors for each spectrum. Although the active scanning angle has been described as approximately 90° as determined by the timing pins 94, 96, in actual practice this angle may be 88°. With an allowance of plus 5° and minus 5° for roll compensation, the usable active scan will be approximately 77° which when recorded on 70mm film can be projected as a direct overlay for standard commercially available geodetic maps.

It will be understood that specific embodiments of the present invention have been described hereinabove for purposes of illustration and they are not intended to limit the present invention, the scope of which is defined by the following claims.

I claim:

1. Apparatus for use in processing analog signals to selectively develop a plurality of digital signals representing a first predetermined number of amplitude levels of said analog signals comprising a first reference source providing a first electrical signal representing a first reference level, a second reference source providing a second electrical signal representing a second reference level, first voltage divider means having a second predetermined number of serially connected impedance means, first circuit means coupling said first and said second reference sources to said first voltage divider means, comparator circuit means including a plurality of individual level detection circuit means each of which has a reference level input and an analog signal input, said reference inputs being connected to said first voltage divider means at respective different points spaced electrically therealong between said impedance means, said signal inputs of all of said level detection means being adapted to be energized by said analog signals, each of said detection circuit means being operable to generate a respective digital signal when said analog signals exceed a respective reference input at each detection circuit means, and output circuit means responsive to said digital signals for developing output signals according to preselected combinations of said digital circuits, and wherein said first circuit means comprises second voltage divider means having a third predetermined number of serially connected impedance means, opposite ends of said second voltage divider means being electrically connected to said first and said second source means respectively, said second divider means having a plurality of taps spaced electrically therealong between said impedance means, and first and second selector switch means each having a plurality of positions for selectively connecting each one of said taps to one end of said first divider means via said first switch means and each one of said taps to an opposite end of said first divider means via said second switch means.

2. The apparatus set forth in claim 1 wherein said first and said second reference sources are fixed direct-current level sources.

3. The apparatus set forth in claim 1 wherein said first and said second reference sources each comprise a sample-and-hold circuit responsive to respective varying reference signals and respective strobe signals to provide said first and said second reference levels.

4. The apparatus set forth in claim 1 wherein said second predetermined number is at least six.

5. The apparatus set forth in claim 4 wherein said second predetermined number is less than approximately eighteen.

6. The apparatus set forth in claim 4 wherein said third predetermined number is six.

7. The apparatus set forth in claim 6 wherein said third predetermined number is less than approximately eighteen.

8. The apparatus set forth in claim 1 wherein said third predetermined number is equal to said second predetermined number.

9. The apparatus set forth in claim 1 wherein said output circuit means comprises a resistive summing network including a first plurality of resistive means each of which is connected to an output of a respective detection circuit means and further including a common resistance means adapted to sum digital signals from said resistive means so that the level of said output signals varies in accordance with the number of actuated level detection means, and wherein said output circuit means further comprises a black-and-white display device responsive to said output signals to generate a grey-scale image.

10. The apparatus set forth in claim 1 wherein said output circuit means comprises a plurality of gating circuit means adapted to respond to selective combinations of actuated level detection means to provide said output signals, and wherein said output circuit means further comprises display means having electron beam generating means responsive to said output signals to generate a display at intensity levels fixed by said gating circuit means.

11. Apparatus for processing analog signals to selectively develop digital signals representing a plurality of different amplitude ranges of said analog signal or a plurality of amplitude subranges within one or more of said amplitude ranges comprising reference source means providing first and second references, first voltage divider means having impedance means with a plurality of taps spaced electrically therealong, said first voltage divider means being adapted to be energized from said reference source means, second voltage divider means also including impedance means, switch means having a plurality of positions for connecting said second voltage divider means across selected taps on said first voltage divider means to thereby establish reference levels at points spaced electrically along said second voltage divider, the value of said reference levels being determined by those taps selected by said switch means, comparator circuit means including a plurality of level detection circuit means each of which has a reference input and an analog signal input, each of said reference inputs being connected to a respective one of said points on said second voltage divider, said signal inputs being adapted to be energized by said analog signals, each of said detection circuit means being responsive to said analog signals and its respective reference level from said second voltage divider means to cause said comparator circuit means to generate said digital signals when said analog signals exceed said reference levels.

12. The apparatus set forth in claim 11 wherein said reference source comprises a source of varying reference signals and a sample-and-hold circuit responsive to said varying signals and to strobe signals to provide said first and second references.

* * * * *